United States Patent [19]

Schneider

[11] 4,414,444

[45] Nov. 8, 1983

[54] PROCESS FOR PRODUCING A CONTACT ELEMENT

[75] Inventor: Friedrich Schneider, Pforzheim, Fed. Rep. of Germany

[73] Assignee: G. Rau GmbH & Co., Pforzheim, Fed. Rep. of Germany

[21] Appl. No.: 234,546

[22] Filed: Feb. 13, 1981

[30] Foreign Application Priority Data

Feb. 15, 1980 [DE] Fed. Rep. of Germany ....... 3005662

[51] Int. Cl.³ .............................................. B23K 27/00
[52] U.S. Cl. ....................... 219/121 LM; 219/121 LF
[58] Field of Search ..... 219/121 L, 121 LM, 121 LE, 219/121 LF, 121 LD, 121 LC, 121 EB, 121 EM, 121 EC, 121 ED, 121 EF, 121 EG; 428/929; 148/127; 29/589, 590; 357/67, 71

[56] References Cited

U.S. PATENT DOCUMENTS

| 3,304,403 | 2/1967 | Harper | 219/121 LC |
| 3,614,832 | 10/1971 | Chance et al. | 219/121 LD X |
| 3,849,757 | 11/1974 | Khammous et al. | 338/328 X |
| 4,281,236 | 7/1981 | von Allmen et al. | 219/121 LD X |
| 4,300,474 | 11/1981 | Livsey | 219/121 LE |

FOREIGN PATENT DOCUMENTS

| 1482044 | 8/1977 | United Kingdom . |
| 1503054 | 3/1978 | United Kingdom . |
| 1574984 | 9/1980 | United Kingdom . |
| 1583835 | 2/1981 | United Kingdom . |

*Primary Examiner*—C. L. Albritton
*Attorney, Agent, or Firm*—Wenderoth, Lind & Ponack

[57] ABSTRACT

A contact element is formed wherein at least one layer, containing a noble metal and/or noble metal alloy, is applied to a carrier of base metal by the action of high-energy light radiation. The layer and carrier are fused to each other to form a connecting stratum produced with the aid of radiation of light of the completely fused layer.

11 Claims, 1 Drawing Figure

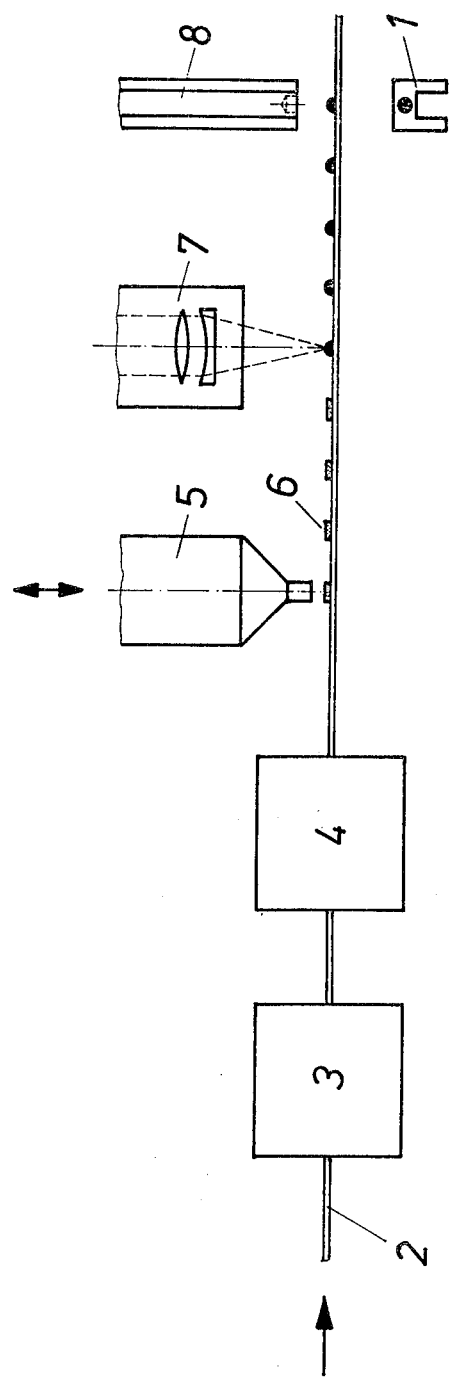

PROCESS FOR PRODUCING A CONTACT ELEMENT

The invention relates to a process for producing a contact element wherein at least one layer is applied to a carrier of base metal by the action of high-energy light radiation, this layer containing at least one noble metal and/or one noble metal alloy.

It is known that noble metals, their alloys and their composite materials are used as contact materials in a wide range of applications. They meet the requirements imposed, namely good electrical and thermal conductivity, low burning loss and reduced tendency to weld up, as well as high corrosion resistance and adequate mechanical strength, these properties occurring in optimum combinations. In view of the high cost of noble metals, there is a need for using them as sparingly as possible. Systems for economising in the use of noble metals are therefore known which are based upon the idea of applying the noble metals only at the actual contact area where the above-stated properties are required.

The prior art includes the welding of portions of wire and sectional material, spheres and small plates or the like of noble metal onto a carrier. In this way a layer of noble metal in the form of a point or island is obtained. However, the known processes, wherein portions of wire or sectional material is used, call for specific minimum volumes of noble metal, in view of the arrangement and geometry of the cutting tools, so that often more noble metal has to be used than would be necessary for achieving contact and the required servicelife.

When welding on spheres and small plates, a certain minimum size (minimum weight) has to be used if automatic feed is to be possible. The production of these spheres or small plates of contact material calls for an additional preparatory operation. In all resistance-welding processes, both when portions of wire or sectional material are used, and in the welding on of spheres or small plates, the welding pressure required between the layer and the carrier may cause difficulties, since it can result in undesirable deformation, particularly in the case of thin contact carriers.

Also known is the connection of a carrier to a layer by laser welding from the rear face of the carrier, in which system the laser beam penetrates the carrier and layer and connects the layer to the carrier in a limited fusion zone that does not cover the entire area of the layer.

SUMMARY OF THE INVENTION

The present invention seeks to enable suitably small volumes of a noble metal or of a noble metal alloy to be applied efficiently and over a large area to the carrier.

According to the invention there is provided a process for producing a contact element comprising a layer of a material containing at least one noble metal and/or one noble metal alloy, and a carrier of base metal, the layer and the carrier being subjected, during manufacture, to the action of high-energy light radiation which acts to completely melt the material of the layer and thereby fuse the layer and the carrier together over a connection stratum.

A contact element of the above kind can be provided by using a quantity of noble metal that is theoretically determined by the nature of the application and the period of use of the element, leading to considerable advantages as regards cost. Furthermore, in the connecting stratum coating produced by the effect of light an efficient fused connection between layer and carrier of large area is achieved, so that a low, constant electrical transfer resistance results.

According to the invention at least one layer is applied to a carrier of base metal by the action of high-energy light radiation, this layer containing a noble metal and/or a noble metal alloy, the process comprising fusing the layer to the carrier by completely melting the material of the layer.

In this process, the fused connection is carried out without any mechanical pressure being applied to the material of the carrier. Pure noble metals as well as their alloys can be applied by this process. Because of the punctiform action of energy at the focal point of the light beam, heating up occurs only within strictly confined limits, and this prevents uncontrolled spreading of the molten noble metal over the material of the carrier. Instead, because of surface tension and heat concentration a drop-like or semi-spherical form of the material of the layer is obtained and, in favourable cases, this can be used as the contact surface without the need for subsequent machining.

It has been found that the fused connection produced by the action of light can be expediently obtained by means of high-energy laser light, and in particular by means of ruby lasers. Light beams produced by means of ruby lasers are particularly suitable for the fusing on of contact materials, since these beams, because of their wave-length, are better absorbed by metals than is gas-laser light ($CO_2$-laser), for example. In the known manner, the layer may be fused onto the carrier in an atmosphere of protective gas so as to avoid undesirable oxidation. The output energy - power density and impulse duration of the laser beam will depend upon the volume to be fused and upon the characteristics of the material.

In an embodiment of the invention, it may be expedient for the layer material used in the fused connection to be in powder form. Such a powder may contain one or more metallic noble and base components, as well as the known additional substances for promoting fusion and/or adhesion, such as boric acid. When several metallic powder components are used, the required noble metal alloy may be produced in the same operation as that in which the layer is connected to the carrier by fusion.

A further advantageous possibility is that of using pulverulent layer material in paste form.

The use of pulverulent layer material offers the advantage that use can be made of metering devices as normally employed in powder metallurgy, or as already used for the purpose of applying solder pastes in automatic soldering installations. When the system of metering in powder form is used, the powder can be compacted to form a shaped body in some other expedient operation, this shaped body facilitating the handling of the required quantity. The metal powder can be advantageously compacted during the shaping procedure.

In production processes that are to be carried out on a continuous basis, it would appear expedient to provide the carrier with an adhesive coating to which the material of the layer is applied in powder form, or on which the shaped body, produced from the powder, is laid. With certain provisions, the layer material may be advantageously used in the form of a cut length of strip or wire. Compared with the known welding processes, this results in the previously explained advantage provided by the technologically more favourable properties of the complete connection and possibly of the semi-spherical form of the contact material.

EXAMPLE I

A disc-like shaped body having a diameter of 1 mm. (0.3 mm. thick) and formed by compressing a powder of noble metal (gold) was attached to a resilient beryllium-bronze carrier, having the dimensions 0.2×5×60 mm., following the application of a suitable adhesive lacquer. The shaped body was then fused onto the carrier by means of ruby laser light having an energy of 6 Ws and an impulse duration of the laser beam of 5 ms. This resulted in a substantially semi-spherical surface of the noble metal layer material, which surface could be immediately used as a contact surface, a good mechanical and electrical connection existing between the layer and the carrier.

EXAMPLE II

In this case, instead of the disc-like shaped body of gold powder used in Example I, use was made of a powder mixture consisting of gold and silver in a weight ratio of 92:8. The action of the ruby laser light resulted in the alloy AuAg8 at the contact point.

EXAMPLE III

Small square plates, having dimensions of 0.8×0.8 mm., were parted off without waste from a tape wound on a bobbin and having dimensions of 0.05×0.8 mm. and consisting of a gold-nickel alloy having the composition 95% Au 5% Ni by weight. These small plates were pressed onto the uncoated carrier material by means of the parting-off tool. In this way, the small plates of noble metal were caused to adhere satisfactorily to the material of the carrier by the adhesion forces and the mechanical locking of the serrations of the metal surfaces, this effect continuing until the materials are fused by the laser beam, the small plates then assuming a spherical shape with a depth of approximately 0.05 mm.

BRIEF DESCRIPTION OF THE DRAWING

The invention will now be described by reference to the accompanying drawing which is a diagrammatic side view of an apparatus for manufacturing contact elements according to the process of the present invention.

DESCRIPTION OF PREFERRED EMBODIMENT

By way of example, the drawing illustrates the steps in the manufacture of a spring contact element 1. The starting carrier material takes the form of a strip 2 of resilient material, which is cleaned in a cleaning station 3 and is provided with an adhesive coating in a coating station 4.

With the aid of a metering device 5, disc-like shaped bodies 6 consisting of powder are laid on that surface of the strip 2 that has been coated with adhesive material. These bodies will form the layers of the contact elements.

The contact material is completely fused onto the carrier material in a welding station 7 with the aid of ruby laser light. This operation results in the substantially semi-circular contact surfaces illustrated in the drawing. The contact elements 1 are then stamped out of the carrier material by a punch 8, and if required, the raised contact areas can be reshaped by further stamping.

I claim:

1. A process for producing a contact element, said process comprising:
    providing a carrier of a non-noble metal material;
    positioning on said carrier a layer of a material including at least one of a noble metal and a noble metal alloy;
    directing to said layer in a punctiform manner high energy light radiation and thereby completely melting said material of said layer, causing the thus melted layer material to self form into a shape suitable for a contact, and fusing said layer to said carrier over the entire area of mutual contact therebetween; and
    stamping from said carrier a contact element formed of said fused layer and carrier material.

2. A process as claimed in claim 1, wherein said radiation is supplied by means of a laser.

3. A process as claimed in claim 2, wherein said laser comprises a ruby laser.

4. A process as claimed in claim 1, wherein said material of said layer is applied to said carrier in the form of a powder.

5. A process as claimed in claim 4, wherein said powder contains a mixture of several metallic components.

6. A process as claimed in claim 4, wherein said powder contains additional substances which promote fusion.

7. A process as claimed in claim 4, wherein said powder is compacted to form a shaped body.

8. A process as claimed in claim 4, wherein said powder is applied in paste form to said carrier.

9. A process as claimed in claim 1, further comprising applying an adhesive coating to said carrier prior to application thereto of said layer.

10. A process as claimed in claim 1, wherein said layer is in the form of a cut length of material.

11. A process as claimed in claim 1, wherein said melted layer material self-forms into a semi-spherical shape.

* * * * *